(12) United States Patent
Niwa et al.

(10) Patent No.: US 6,498,127 B1
(45) Date of Patent: Dec. 24, 2002

(54) COMPOSITE SLIDING MATERIAL

(75) Inventors: Takahiro Niwa, Nagoya (JP);
Nobutaka Hiramatsu, Nagoya (JP);
Takayuki Shibayama, Nagoya (JP)

(73) Assignee: Daido Metal Company Ltd., Nagoya (JP)

(*) Notice: Subject to any disclaimer, the term of this patent is extended or adjusted under 35 U.S.C. 154(b) by 115 days.

(21) Appl. No.: 09/688,688

(22) Filed: Oct. 17, 2000

(30) Foreign Application Priority Data

Nov. 9, 1999 (JP) .......................... 11-318135

(51) Int. Cl.$^7$ .......................... B22F 7/04; C10M 171/06
(52) U.S. Cl. .......................... 508/104; 508/103; 428/550
(58) Field of Search .......................... 508/103, 104; 428/550

(56) References Cited

U.S. PATENT DOCUMENTS

| | | | |
|---|---|---|---|
| 1,661,245 A | * | 3/1928 | Williams |
| 1,738,163 A | * | 3/1929 | Williams |
| 2,691,814 A | * | 10/1954 | Tait |
| 4,732,818 A | * | 3/1988 | Pratt et al. |
| 4,904,537 A | * | 2/1990 | Lytwynec |
| 5,624,887 A | | 4/1997 | Nakamaru et al. |
| 5,643,683 A | | 7/1997 | Tanaka et al. |
| 5,732,322 A | * | 3/1998 | Nakamaru et al. |
| 6,015,775 A | * | 1/2000 | Takayama et al. |

FOREIGN PATENT DOCUMENTS

JP 10212534 8/1998

* cited by examiner

Primary Examiner—Jerry D. Johnson
(74) Attorney, Agent, or Firm—Browdy and Neimark, P.L.L.C.

(57) ABSTRACT

Disclosed is a composite sliding material consisting of a back metal, a porous alloy layer which is formed on the surface of the back metal by sintering a copper alloy powder, and a resin layer which is formed so as to impregnate into and cover the porous alloy layer. The alloy layer consists of sintered copper alloy particles and has a thickness of superimposed plural particles. The copper alloy powder has an average particle size of 25 to 100 μm so that the composite sliding material has smallersliding-contact resistance.

6 Claims, 2 Drawing Sheets

COMPOSITE SLIDING MATERIAL

BACKGROUND OF THE INVENTION

1. Field of the Invention

The present invention relates to a composite sliding material applicable to bearings and so on.

2. Brief description of the Art

JP-A-10-212534 (which is a Japanese patent application filed by the same assignee) discloses a composite sliding material, as shown in FIG. 3, which consists of a back metal 1, a porous alloy layer 2 and a resin layer 3, wherein the porous alloy layer is formed on the surface of the back metal by sintering an alloy powder and the resin layer is formed so as to impregnate into and cover the porous alloy layer. The alloy layer 2 is provided on the back metal 1 in order to firmly bond the resin layer 3 to the back metal since the resin layer is not strongly bonded to the back metal. The alloy layer consists of sintered alloy particles having an average particle size of 125 μm and has a thickness of superimposed about three alloy particles.

Whereas, recently, a composite material, of the same type as stated above but having smaller sliding-contact resistance, has been required. Under such a requirement, the inventors noted that there is a significant relationship between a degree of the sliding-contact resistance and a recession depth of the resin layer resulted from deformation by a load exerted on the resin layer, and examined a sliding material with a resin-layer filled with a hard material. However, the hard material is liable to attack the mating member. Although it is possible to reduce the deformation degree or the recession depth of the resin layer by making the resin layer thin, the alloy layer is liable to be exposed due to a small wear loss of the thin resin layer, whereby a problem of durability arises.

On the other hand, the inventors found by trial and error that the recession depth of the resin layer resulted from deformation under loading is affected also by elastic deformation of the alloy layer. However, taking this finding into consideration, if the number of superimposed alloy particles is reduced, bonding strength of the resin layer to the back metal is decreased resulting in that a separation may occur.

BRIEF SUMMARY OF THE INVENTION

Accordingly, an object of the present invention is to provide a composite sliding material comprising a back metal, a porous alloy layer which is formed on the surface of the back metal by sintering an alloy powder, and a resin layer which is formed so as to impregnate into and cover the porous alloy layer, which has a lower sliding-contact resistance, while ensuring enough bonding strength of the resin layer to the back metal, by making alloy particles constituting the alloy layer to have a smaller particle size.

According to a key aspect of the invention, there is provided a composite sliding material comprising a back metal, a porous alloy layer which is formed on the surface of the back metal by sintering a copper alloy powder, and a resin layer which is formed so as to impregnate into and cover the porous alloy layer, wherein the copper alloy powder has an average particle size of 25 to 100 μm, and the alloy layer, consisting of sintered copper alloy particles, has a thickness of superimposed plural particles.

According to an application manner of the composite sliding material, such as a wet or dry condition of operation, optionally the resin layer may be thermoplastics including fluorocarbon polymer (such as PTFE), polyacetal (such as POM) and aromatic polyether ketone (such as PEEK); thermosetting resin including phenol and polyimide; an admixture thereof; or any one of these into which graphite or molybdenum sulfide ($MoS_2$) is added.

The copper alloy constituting the alloy layer may comprise typically Sn, P or Pb. Since a much amount of Sn makes the alloy layer hard, Sn is limited to an amount range of 6 to 15 mass %, desirably 8 to 12 mass %. Regarding P (phosphorus), it is desirably added into the copper alloy in order to improve sintering capability. But, since a much amount of P makes the alloy layer hard to have high attack property against the mating member, the amount of P is limited to less than 0.6 mass %. Regarding Pb, in the case where the composite sliding material is used under a wet condition, 3 to 12 mass % of additive Pb improves sliding-contact property of the material. Thus, the additive alloying elements may be optionally selected as a combination thereof or a single element taking an application manner of the material into consideration.

While the alloy layer is formed to be porous by sintering the copper alloy powder, if the porosity thereof is small, the amount of resin impregnation into the porous alloy layer becomes smaller resulting in separation of the resin layer from the alloy layer. Thus, the alloy layer has desirably a porosity of not less than 20%.

The smaller the average particle size of the copper alloy particles constituting the alloy layer is, the smaller the sliding-contact resistance becomes. Taking this into consideration, the average particle size is limited to a range of 25 to 100 μm. The lower limit is set because, if the average particle size is less than 25 μm, the bonding strength of the resin layer to the alloy layer is inferior.

Further, with respect to the thickness of superimposed alloy particles or the number of superimposed alloy particles which constitute the alloy layer, the smaller the number is, the smaller the sliding-contact resistance becomes. But, if the number is "1", the bonding strength of the resin layer to the alloy layer is inadequate leading to liability to separation of the both layers, and the composite sliding material will have high attack property against the mating member. Thus, the alloy layer is defined to have a thickness of superimposed plural alloy particles. Preferably, the alloy particles are superimposed in the thickness direction by the particle number of 2 to 4 taking the sliding-contact resistance into consideration. Although the respective alloy particles has desirably a spherical form, it may have other forms.

As defined in claim 1, the composite sliding material comprises a back metal, a porous alloy layer which is formed on the surface of the back metal by sintering a copper alloy powder, and a resin layer which is formed so as to impregnate into and cover the porous alloy layer, wherein the copper alloy powder has an average particle size of 25 to 100 μm; and the alloy layer, consisting of sintered copper alloy particles, has a thickness of superimposed plural particles, whereby it does not so damage the mating member and has a smaller sliding-contact resistance.

Details of the invention are provided herein below.

BRIEF DESCRIPTION OF PREFERRED EMBODIMENTS OF THE PRESENT INVENTION

Experiment 1:

In order to examine an influence of the thickness of the alloy layer upon the sliding-contact resistance, an experiment 1 was carried out in the following manner.

1. In order to prepare six specimens 1 to 6 by using different amounts of the powder with one another as shown in Table 1, a copper alloy powder was spread on a back metal 1 made of a steel plate with a copper plating, respectively, the copper alloy powder having an adjusted average particle size of 75 μm. (see FIGS. 1 to 3)

2. The specimens 1 to 6 each having the dispersed powder on the back metal 1 were subjected to sintering treatment by holding them in a reduction atmosphere at 750° C. to 900° C. for 10 to 30 minutes in order to form a porous alloy layer 2, respectively.

TABLE 1

ALLOY LAYER
Cu ALLOY POWDER: 75 μm OF AVERAGE PARTICLE SIZE

| SPECIMEN NO. | AMOUNT OF SPREAD (mg/cm$^2$) | SUPER-IMPOSED PARTICLE NUMBER | COMPOSITION | THICKNESS (μm) | COMPOSITION OF RESIN LAYER | MEASUREMENT VALUE | |
| --- | --- | --- | --- | --- | --- | --- | --- |
| | | | | | | ELASTIC DEFORMATION (μm) | SLIDING RESISTANCE (Newton) |
| 1 | 50 | 1 | Cu—Sn | 75 | PTFE-Pb | 91 | 62 |
| 2 | 100 | 3 | Cu—Sn | 185 | PTFE-Pb | 103 | 78 |
| 3 | 140 | 4 | Cu—Sn | 250 | PTFE-Pb | 112 | 89 |
| 4 | 175 | 5 | Cu—Sn | 310 | PTFE-Pb | 132 | 116 |
| 5 | 100 | 3 | Cu—Sn | 185 | PTFE-Gr | 100 | 60 |
| 6 | 100 | 3 | Cu—Sn—Pb | 185 | PTFE-Pb | 105 | 82 |

Referring to Table 1, the Cu—Sn alloy consisted essentially of, by mass percent (%) 10% Sn, 0.2% P (phosphorous) and balance of Cu, and the Cu—Sn—Pb alloy consisted essentially of, by mass percent (%), 10% Sn, 5% Pb, 0.2% P (phosphorous) and balance of Cu.

Figure 1:
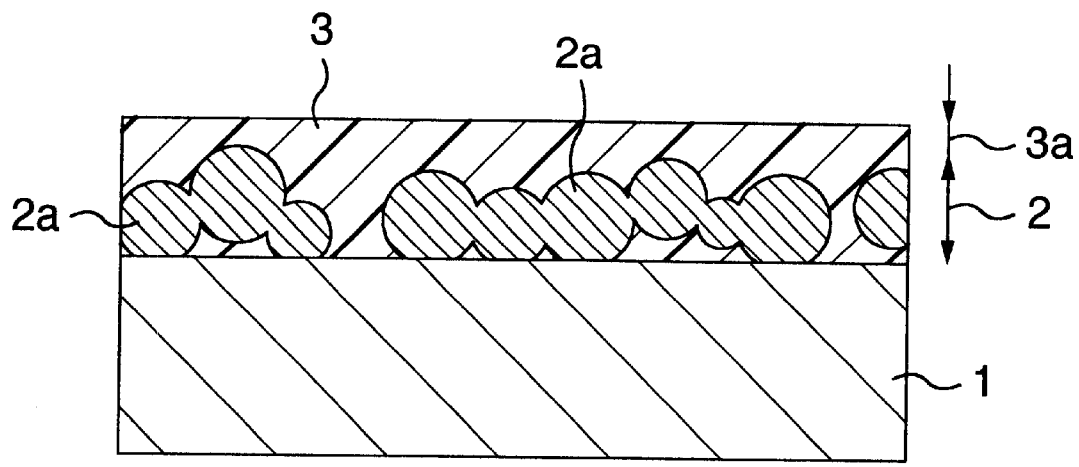
FIG. 1 is a partial sectional view of specimen 1.
Figure 2:
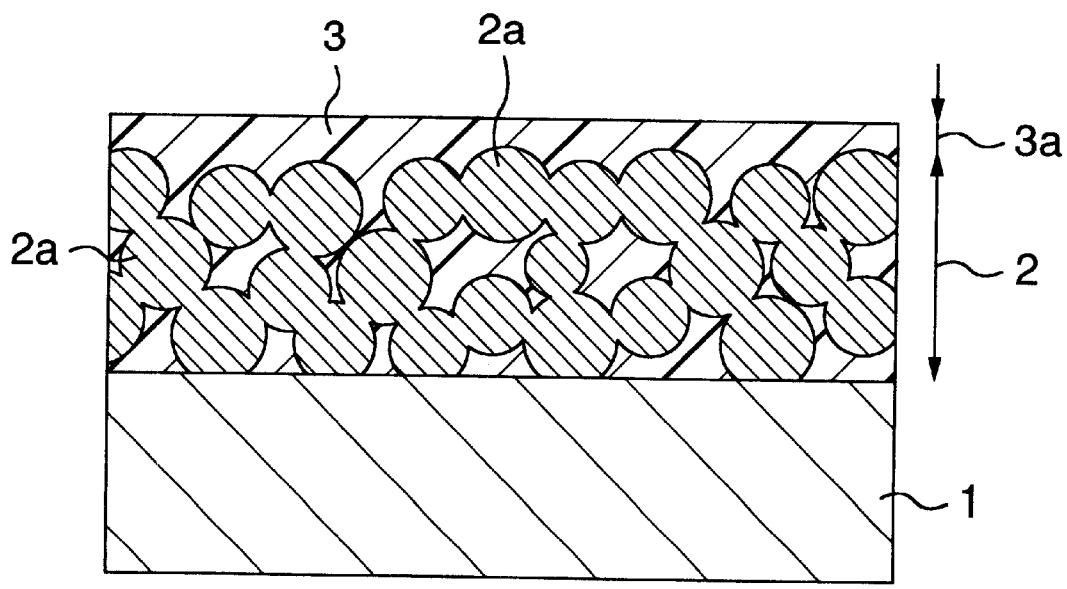
FIG. 2 is a partial sectional view of specimen 1.
Figure 3:
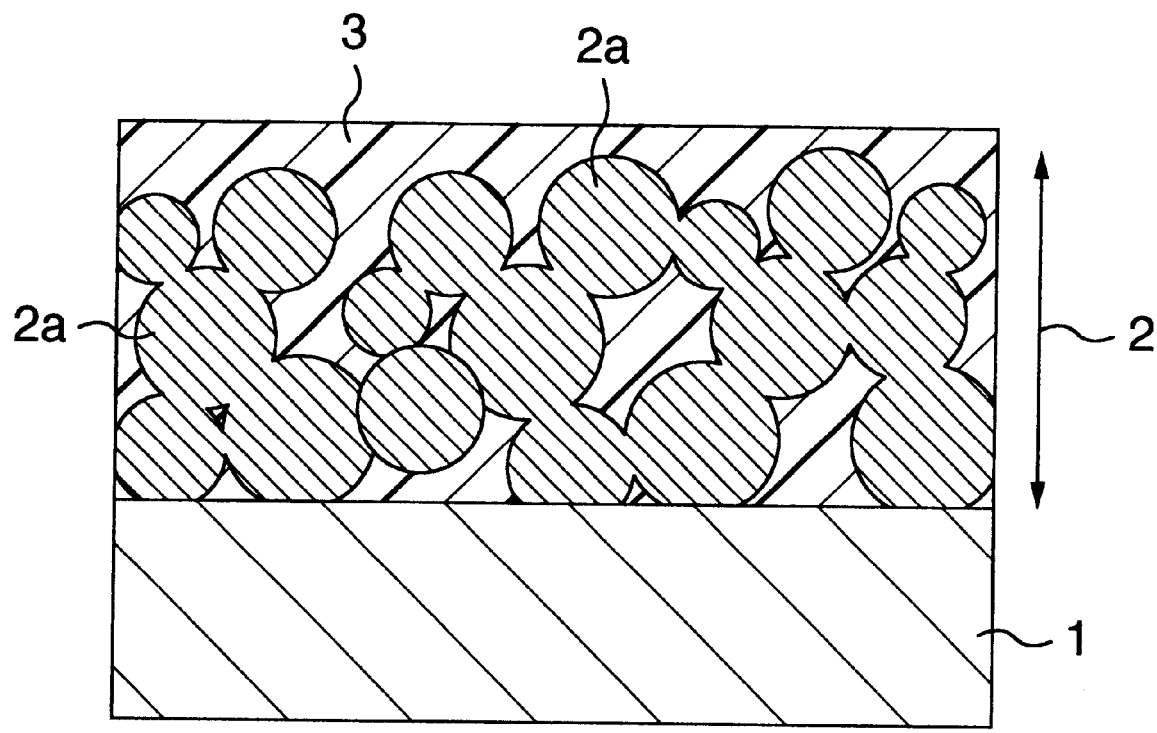
FIG. 3 is a partial sectional view of a known composite sliding material with a resin layer.

By the sintering treatment, four types of sintered body were prepared, which were specimen 1 comprising a sintered copper alloy layer having a thickness corresponding to a single particle of the copper alloy as shown in FIG. 1, specimens 2, 5 and 6 each comprising a sintered copper alloy layer having a thickness corresponding to superimposed three particles of the copper alloy as shown in FIG. 2, specimen 3 comprising a sintered copper alloy layer having a thickness corresponding to superimposed four particles of the copper alloy, and specimen 4 comprising a sintered copper alloy layer having a thickness corresponding to superimposed five particles of the copper alloy.

After sintering, the all specimens except for specimen 5 were provided with a resin layer 3, respectively, by coating the sintered alloy layer 2 with a mixture of polytetrafluoroethylene (PTFE) and 20 vol % Pb so as to impregnate the resin of PTFE into the porous sintered alloy layer, followed by sintering at 350° C. to 400° C. and rolling, so that multi-layered plates each having a thickness of 2.0 mm were prepared. In the respective specimen multi-layered plates, the resin layer 3 had a predetermined constant thickness 3a of 20 μm while the back metal 1 had been previously adjusted to have a proper thickness taking a thickness of the alloy layer 2 and the constant thickness of the resin layer into consideration.

The multi-layered plates were cut to prepare finished specimens 1 to 6 for an elastic deformation test.

It should be noted that, in specimen 5, the resin layer 3 was of a mixture of PTFE and 5 vol % graphite (Gr) in order to examine an effect of the additive material in the resin layer 3.

In the elastic deformation test, a load of 50 MPa per unit area was exerted on the respective specimens with utilization of a compression test machine to determine an elastic deformation amount by means of the dial gage. The test result is shown in Table 1 (see the column of "ELASTIC DEFORMATION").

The multi-layered plates were also cut to prepare other specimens 1 to 6 for a sliding test in which a sliding-contact resistance was determined. The respective cut specimens was bent to have a cylindrical form with an inner diameter of 41 mm, a width of 20 mm and a thickness of 2.0 mm.

With regard to the thus obtained specimens 1 to 6, the sliding test was carried out under the test conditions shown in Table 2 with utilization of a reciprocating-sliding test machine to determine a sliding-contact resistance. The test result is shown in Table 1 (see the column of "SLIDING RESISTANCE").

TABLE 2

| TEST CONDITIONS OF RECIPROCATING-SLIDING TEST | |
| --- | --- |
| 1. USED MACHINE | A RECIPROCATING-SLIDING TEST MACHINE |
| 2. SIZE OF SPECIMENS | INNER DIAMETER: 41 mm, WIDTH: 20 mm, THICKNESS: 2.0 mm |
| 3. EXERTED LOAD | 1,000 Newton |
| 4. SLIDING SPEED | 0.01 m/sec |
| 5. SLIDING STROKE | 10 mm |
| 6. LUBRICANT | SHOCK ABSORBER OIL |

From the test results, it was found that there is a specific correlation between the thickness of the alloy layer (corresponding to the number of superimposed copper alloy particles) and the sliding-contact resistance, according to which, the larger the thickness is, the greater the deformation amount to the exerting load becomes resulting in increased sliding-contact resistance.

With regard to specimen 1 in which the copper alloy layer had a thickness corresponding to a single particle size, there occurred a de-lamination of the resin layer due to lack of bonding strength.

With regard to specimen 6 in which the copper alloy layer was made soft by adding Pb therein, it had a larger deformation amount and greater sliding-contact resistance as compared with specimen 2.

Experiment 2:

In order to examine an effect of the particle size of the alloy layer on the sliding-contact resistance, copper alloy powders having the same alloy compositions as those used in Experiment 1, respectively, were used and adjusted to have average particle sizes of 25, 50, 75, 100 and 125 μm, respectively. The respective copper alloy powders was spread on a back metal 1 similarly to Experiment 1, wherein the spread amount of the powder was determined such that the copper alloy layer has a thickness corresponding to three superimposed alloy particles like as specimen 2.

With regard to specimen 11, a Cu—Sn—Pb alloy powder was used in order to examine an effect of the chemical composition of the alloy layer 2.

TABLE 3

| | ALLOY LAYER | | | MEASUREMENTS | |
|---|---|---|---|---|---|
| SPECIMEN No. | AMOUNT OF SPREAD (mg/cm$^2$) | COMPOSITION | AVERAGE PARTICLE SIZE ($\mu$m) | ELASTIC DEFORMATION ($\mu$m) | SLIDING-CONTACT RESISTANCE (N) |
| 7 | 35 | Cu—Sn | 25 | 30 | 74 |
| 8 | 65 | Cu—Sn | 50 | 92 | 77 |
| 2 | 100 | Cu—Sn | 75 | 105 | 82 |
| 9 | 140 | Cu—Sn | 100 | 121 | 92 |
| 10 | 175 | Cu—Sn | 125 | 150 | 120 |
| 11 | 175 | Cu—Sn—Pb | 125 | 155 | 124 |

*Note:
The number of superimposed particles was "3" in every specimen. The resin layer was of PTFE-Pb.

With regard to specimens 7 to 11 which were prepared similarly to Experiment 1, tests for the elastic deformation and the sliding-contact resistance was determined under the same test conditions as those in Experiment 1. The test result is shown in Table 3.

From the test results, it was found that there is a specific correlation between the alloy particle size and the sliding-contact resistance, according to which, the larger the particle size is, the greater the deformation amount to the exerting load becomes resulting in increased sliding-contact resistance.

With regard to specimen 11 in which the copper alloy layer 2 was made soft by adding Pb therein, it had a slightly larger deformation amount and also slightly greater sliding-contact resistance as compared with specimen 10.

As is apparent from the above, there is provided a composite sliding material having a smaller elastic deformation amount and lower sliding-contact resistance. It is preferably applicable to a member which is used in a reciprocating movement device (e.g. a shock absorber or a solenoid valve) under a wet lubricating condition.

What is claimed is:

1. A composite sliding material comprising a back metal, a porous alloy layer which is formed on the surface of the back metal by sintering a copper alloy powder, and a resin layer which is formed so as to impregnate into and cover the porous alloy layer, wherein:

the copper alloy powder consists of particles having an average particle size of 25 to 100 $\mu$m; and the alloy layer of sintered copper alloy particles has a thickness greater than the thickness of one layer of the copper powder particles but not greater than four layers of the copper powder particles.

2. A composite sliding material according to claim 1, wherein the sintered porous alloy layer has a porosity of not less than 20%.

3. A composite sliding material according to claim 1, wherein the resin of said resin layer is selected from the group consisting of fluorocarbon polymer, polyacetal, aromatic polyether ketone, phenol, polyimide and a mixture thereof.

4. A composite sliding material in a reciprocating movement device under a wet lubricating condition, comprising a back metal, a porous alloy layer which is formed on the surface of the back metal by sintering a copper alloy powder, and a resin layer which is formed so as to impregnate into and cover the porous alloy layer, wherein:

the copper alloy powder consists of particles having an average particle size of 25 to 100 $\mu$m; and the alloy layer of sintered copper alloy particles has a thickness greater than the thickness of one layer of the copper powder particles but not greater than four layers of the copper powder particles.

5. A composite sliding material according to claim 4, wherein the sintered porous alloy layer has a porosity of not less than 20%.

6. A composite sliding material according to claim 4, wherein the resin of the resin layer is selected from the group consisting of fluorocarbon polymer, polyacetal, aromatic polyether ketone, phenol, polyimide and a mixture thereof.

* * * * *